United States Patent [19]
Zellhoefer

[11] 3,975,209
[45] Aug. 17, 1976

[54] THERMAL CELL WITH AN ANODE COMPRISING A MAGNESIUM ALLOY WITH A REFRACTORY OXIDE

[75] Inventor: Glenn F. Zellhoefer, Normal, Ill.

[73] Assignee: National Union Electric Corporation, Stamford, Conn.

[22] Filed: June 21, 1965

[21] Appl. No.: 465,771

[52] U.S. Cl. .............................. 136/83 T; 136/90; 136/120 R; 136/153
[51] Int. Cl.² ........................................ H01M 6/36
[58] Field of Search ............... 136/83, 153, 90, 120, 136/120 R, 83 T

[56] References Cited
UNITED STATES PATENTS

| | | | |
|---|---|---|---|
| 2,707,199 | 4/1955 | Ruben .................................. | 136/83 |
| 2,959,631 | 11/1960 | Boswell ........................... | 136/120 X |
| 3,056,647 | 10/1962 | Amphlelt .................... | 136/153 UX |
| 3,056,849 | 10/1962 | Warren et al. ........................ | 136/83 |
| 3,110,632 | 11/1963 | Zellhoefer .......................... | 136/100 |
| 3,201,281 | 8/1965 | Solomon et al. .................. | 136/83 X |
| 3,258,365 | 6/1966 | Klopp et al. ......................... | 136/90 |

FOREIGN PATENTS OR APPLICATIONS 698,637    11/1964    Canada ............................... 136/83

*Primary Examiner*—Edward A. Miller
*Attorney, Agent, or Firm*—Albert W. Bicknell

EXEMPLARY CLAIM

1. In a pellet type thermal cell including a mass of electrolyte, a depolarizing agent, a cathode, and an anode; the improvement wherein said anode comprises a pelletized mixture of a refractory oxide selected from the group consisting of zirconium oxide and alumina and an alloy containing from about 10 wt. % to about 20 wt. % lithium, from about 1 wt. % to about 6 wt. % aluminum, and the balance essentially magnesium, said refractory oxide being present in said anode in a minor amount sufficient to retard side reactions and general deterioration of the cell.

18 Claims, No Drawings

THERMAL CELL WITH AN ANODE COMPRISING A MAGNESIUM ALLOY WITH A REFRACTORY OXIDE

This invention relates to improvements in thermal cells and more particularly to a novel and improved anode for use in a pellet type thermal cell.

A thermal cell is an electrochemical power supply utilizing as the electrolyte an inorganic salt composition which is solid and nonconducting at ordinary temperatures. The cell is activated by heating it to a temperature sufficiently high to fuse or melt the electrolyte which thereby becomes conductive so that electrical energy may then be withdrawn from the system. A plurality of thermal cells may be connected to provide a thermal battery characterized by long shelf life, ruggedness, and the ability to develop full voltage rapidly over a substantial range of ambient temperature.

The choice of anode and cathode for a thermal cell appears to be the controlling factor which determines the e.m.f. of the cell. Calcium and magnesium are examples of commonly used anode metals. Although calcium is the preferred anode metal in some of the commonly used electrochemical systems because of the higher peak voltage obtained from a cell having a calcium anode, there are definite disadvantages with calcium because of its sensitivity to moisture and its tendency to react with lithium salts to form a low melting point lithium-calcium alloy.

My prior U.S. Pat. No. 3,110,632, issued Nov. 12, 1963, describes a novel anode metal composition comprising an alloy of lithium, aluminum, and magnesium which possesses the advantages of a calcium anode but avoids the aforementioned disadvantages. However, I have now discovered that when such a lithium-aluminum-magnesium anode is used in a pellet type thermal cell, certain additional improvements are necessary in order to obtain optimum operating characteristics, particularly when a comparatively long cell life is required. For example, in a thermal battery of the pulse type which provides peak voltage for a period of 10 seconds or less, the anode metal composition described in the aforementioned prior patent is entirely satisfactory and may be used as such without the addition of other ingredients. However, when pellet type thermal cells are used and a peak voltage of longer duration (e.g. 40 to 100 seconds) is necessary, such as in a power battery, it has been found that the lithium-aluminum-magnesium alloy requires the addition of a further ingredient in order to prevent side reactions and deterioration of the cells.

Accordingly, the primary object of the present invention is to provide a novel and improved anode composition for use in a pellet type thermal cell.

A further object of the invention is to provide a novel and improved lithium-aluminum-magnesium anode for use in a pellet type thermal cell.

An additional object of the invention is to provide a novel anode for a pellet type thermal cell which can be readily granulated and pelletized and which affords a long cell life and a high peak voltage with good voltage regulation under various types of loads and over a wide range of ambient temperature.

The so-called pellet type thermal cell contains various layers of powdered or granulated ingredients which are compressed to form an integral pellet having distinct layers in intimate contact at their interfaces. For example, one common type of thermal cell of the pellet type is made by simultaneously compressing three layers of powders under a pressure of 40,000 to 60,000 p.s.i. The three layers are the catholyte, anolyte, and anode of the cell. The catholyte layer may comprise a powdered mixture of a suitable depolarizer and an electrolyte such as a eutectic mixture of potassium chloride and lithium chloride. The anolyte layer may comprise a powdered mixture of an electrolyte, such as a eutectic mixture of potassium chloride and lithium chloride, and a suitable clay to impart non-flow properties to the mixture at temperatures above the fusion temperature of the electrolyte. The anode layer may comprise an active metal in pressed powder form such as magnesium, calcium, or an alloy of 10 wt. % lithium and 90 wt. % lead. The complete thermal cell is assembled by disposing the three-layer pellet between a pair of metal disks having extensions or leads projecting therefrom and by providing a suitable heat source material, such as a pyrotechnic material, at the outside of each disk. The disk in contact with the anode layer of the pellet serves the dual purpose of protecting the anode metal from chemical reaction with the heat source material during the active life of the cell and also conducting electrons from the face of the anode to the anode lead. The disk in contact with the catholyte layer of the pellet comprises the cathode of the cell and may be nickel (with or without a fused coating of $V_2O_5$ and $B_2O_3$ on the side of the disk contacting the catholyte), stainless steel, or Inconel. For a further detailed description of the general construction of a pellet type thermal cell, reference is made to my copending applications Ser. Nos. 114,050 and 114,051, filed June 1, 1961.

Pellet type thermal cells have been made utilizing a number of different anode metals, including magnesium, calcium, and an alloy of 10 wt. % lithium and 90 wt. % lead. However, each of these anode metals has certain disadvantages when used in a pellet system. Cells made with a magnesium anode give good voltage regulation but at a relatively low voltage level. The calcium anode provides a cell with a relatively high peak voltage but relatively poor voltage regulation. There is also the serious disadvantage of fire hazard in granulating and pelletizing calcium. Furthermore difficulty often is encountered in the operation of a calcium anode cell due to the formation of a low melting lithium-calcium alloy that may flow around the edge of the cell and cause shorting. Cells made with lithium-lead alloy have a peak voltage comparable to cells made with the calcium, but the voltage regulation is generally inferior to that of cells made with magnesium although superior to that of cells made with calcium. However, a serious disadvantage of the lithium-lead alloy is its tendency to react vigorously with moisture to form lithium hydroxide and hydrogen resulting in deterioration of the metal and involving hazards of fire and explosion. The alloy reacts slowly with moisture when exposed to an atmosphere of 5% relative humidity and the rate of reaction increases rapidly with an increase in relative humidity. Its reactivity with moisture is substantially greater than that of calcium.

The lithium-aluminum-magnesium anode described in U.S. Pat. No. 3,110,632 avoids all of the above-described disadvantages of calcium, magnesium or lithium-lead anodes. However, as mentioned above, in a pellet type system it has been found that side reactions and deterioration of the cell tend to occur with the lithium-aluminum-magnesium anode, particularly in the case of a cell having a relatively long life, e.g. 40 to 100 seconds. In accordance with the present invention, these adverse side reactions and general deterioration of the cell are retarded or prevented by including in the pelletized anode a refractory oxide such as zirconium oxide or alumina.

The lithium-aluminum-magnesium alloy component of the anode may contain from about 10 wt. % to about 20 wt. % lithium, from about 1 wt. % to about 6 wt. % aluminum, and the balance essentially magnesium. Preferably, the alloy comprises from about 13 wt. % to about 15 wt. % lithium, from about 1 wt. % to about 1.5 wt. % aluminum, and the balance essentially magnesium. For optimum effectiveness, the impurities in the alloy should be limited as follows:

| | |
|---|---|
| manganese | 0.15 wt. % max. |
| silicon | 0.10 wt. % max. |
| copper | 0.04 wt. % max. |
| nickel | 0.005 wt. % max. |
| iron | 0.005 wt. % max. |
| sodium | 0.005 wt. % max. |
| other impurities | 0.30 wt. % max. |

Of the foregoing, it is particularly desirable to observe the limitation on sodium content.

The refractory oxide component of the anode may have a particle size of from about 80 to about 325 mesh (standard U.S. screen), and the lithium-aluminum-magnesium alloy component is granulated to a particle size of from about 80 to about 120 mesh (standard U.S. screen). A minor amount of the refractory oxide powder is intimately mixed with a major amount of the alloy powder, and for best results it is generally desirable to include also a minor amount of a fusible salt electrolyte such as a lithium chloride-potassium chloride mixture, preferably the eutectic mixture comprising about 45 wt. % LiCl and about 55 wt. % KCl. Although in some applications the electrolyte may be omitted from the anode composition, its presence is usually desirable in order to reduce the electrical resistance of the cell. Although other refractory oxides, such as alumina, may be used, the preferred material is zirconium oxide because of its density and other physical properties.

In the case of the preferred anode composition, including both the refractory oxide and electrolyte ingredients, the amounts of zirconium oxide and lithium chloride-potassium chloride eutectic used may vary depending upon the anticipated load and other operating conditions of the cell. However, the proportions will generally fall within the following ranges:

| | |
|---|---|
| zirconium oxide | 10 to 16 wt. % |
| LiCl–KCl eutectic | 9 to 13 wt. % |
| Li–Al–Mg alloy | 71 to 81 wt. % |

The anode of the present invention may be used in any suitable electrochemical system. Preferably, the fusible electrolyte of the system comprises a mixture of lithium chloride-potassium chloride. The eutectic mixture is the most suitable electrolyte, i.e. about 45 wt. % lithium chloride and about 55 wt. % potassium chloride. The cathode of the cell may be nickel, stainless steel or Inconel (alloy containing from about 77.8 wt. % to about 80 wt. % nickel, from about 13 wt. % to about 13.5 wt. % chromium, balance essentially iron). The cathode is used in conjunction with a suitable depolarizer, e.g. vanadium pentoxide, potassium chromate, calcium chromate, barium chromate, or lead chromate. However, the novel anode of the present invention is particularly advantageous when the depolarizer comprises vanadium pentoxide.

A pellet type thermal cell with an anode of the composition described herein provides high peak voltage with excellent voltage regulation and lends itself to efficient, hazard-free production. A battery made with these cells has an exceptionally high watt-hour capacity per unit weight and per unit volume. The peak open circuit voltage is as anticipated on the basis of theory, but the current carrying capacity and voltage regulation are substantially better than might be expected. In general, an increase of 40 to 65% in power per unit volume of battery may be realized by the use of this anode.

The following specific example of a thermal cell utilizing the abovedescribed anode will further illustrate the principles of the invention.

EXAMPLE

A pellet type thermal cell was assembled using the conventional construction heretofore described and embodying the electrochemical system M/LiCl—KCl—kaolin/LiCl—KCl—$V_2O_5$/$V_2O_5$—$B_2O_3$/Ni wherein M comprises an anode metal. The pellet or pressed powder portion of the cell consisted of three layers, namely, an innermost anolyte layer sandwiched between outermost catholyte and anode layers. The compositions of the respective layers were as follows:

Anode - an intimate mixture of about 13 wt. % zirconium oxide powder (80–325 mesh), about 11 wt. % lithium chloride-potassium chloride eutectic mixture (45 wt. % LiCl and 55 wt. % KCl), and about 76 wt. % lithium-aluminum-magnesium alloy powder (80–120 mesh). The composition of the alloy was approximately as follows (wt. %):

| | | |
|---|---|---|
| lithium | 14.0 | |
| aluminum | 1.0 | |
| manganese | 0.15 | max. |
| silicon | 0.10 | max. |
| copper | 0.04 | max. |
| nickel | 0.005 | max. |
| iron | 0.005 | max. |
| sodium | 0.005 | max. |
| other impurities | 0.30 | max. |
| magnesium | balance | |

The melting point of the alloy was approximately 580°C.

Anolyte — an intimate mixture of about 38 wt. % kaolin and about 62 wt. % of the LiCl — KCl eutectic mixture, the kaolin functioning as a non-flow agent as more fully described in my copending application Ser. No. 536,685, filed Sept. 23, 1955.

Catholyte — an intimate mixture of about 62 wt. % vanadium pentoxide and about 38 wt. % of the LiCl — KCl eutectic mixture, the vanadium pentoxide functioning as a depolarizer as also more fully described in my copending application Ser. No. 536,685, filed Sept. 23, 1955.

The pellet was mounted between a nickel disk in contact with the anode layer and another nickel disk in contact with the catholyte layer, the latter comprising the cathode of the cell. The side of the cathode disk in contact with the catholyte was provided with a thin fused coating (0.0005 to 0.001 inch) of an electrically conductive glass comprising about 16 wt. % $B_2O_3$ and about 84 wt. % $V_2O_5$ in order to improve the cell performance, as more fully described in the copending application of John H. Zauner and Glenn F. Zellhoefer, Ser. No. 496,316 filed Mar. 23, 1955.

Comparative tests showed that the above-described cell developed an open circuit peak voltage of from about 3.3 to about 3.4 volts, whereas a comparable cell having a magnesium anode developed from about 2.8 to about 2.85 volts.

I claim:
1. In a pellet type thermal cell including a mass of electrolyte, a depolarizing agent, a cathode, and an anode; the improvement wherein said anode comprises a pelletized mixture of a refractory oxide selected from the group consisting of zirconium oxide and alumina and an alloy containing from about 10 wt. % to about 20 wt. % lithium, from about 1 wt. % to about 6 wt. % aluminum, and the balance essentially magnesium, said refractory oxide being present in said anode in a minor amount sufficient to retard side reactions and general deterioration of the cell.

2. A thermal cell according to claim 1 further characterized in that said refractory oxide comprises zirconium oxide.

3. A thermal cell according to claim 1 further characterized in that said anode also comprises a minor amount of a fusible salt electrolyte.

4. A thermal cell according to claim 1 further characterized in that said anode also comprises a minor amount of a lithium chloride-potassium chloride mixture.

5. A thermal cell according to claim 1 further characterized in that said anode also comprises a minor amount of a eutectic mixture of lithium chloride and potassium chloride.

6. A thermal cell according to claim 1 further characterized in that said refractory oxide has a particle size of from about 80 to about 325 mesh and said alloy has a particle size of from about 80 to about 120 mesh.

7. A thermal cell according to claim 1 further characterized in that said anode comprises from about 10 wt. % to about 16 wt. % zirconium oxide, from about 9 wt. % to about 13 wt. % eutectic mixture of lithium chloride and potassium chloride, and from about 71 wt. % to about 81 wt. % of said alloy.

8. A thermal cell according to claim 1 further characterized in that said anode comprises about 13 wt. % zirconium oxide, about 11 wt. % eutectic mixture of lithium chloride and potassium chloride, and about 76 wt. % of said alloy.

9. A thermal cell according to claim 1 further characterized in that said electrolyte comprises a lithium chloride-potassium chloride eutectic mixture, said depolarizing agent comprises vanadium pentoxide, and said cathode is selected from the group consisting of nickel, stainless steel, and Inconel.

10. In a pellet type thermal cell having the electrochemical system M/LiCl—KCl—kaolin/LiCl—KCl—$V_2O_5$/$V_2O_5$ — $B_2O_3$/Ni wherein M comprises an anode metal; the improvement wherein M comprises a pelletized mixture of a refractory oxide selected from the group consisting of zirconium oxide and alumina and an alloy containing from about 10 wt. % to about 20 wt. % lithium, from about 1 wt. % to about 6 wt. % aluminum, and the balance essentially magnesium, said refractory oxide being present in said anode in a minor amount sufficient to retard side reactions and general deterioration of the cell.

11. A thermal cell according to claim 10 further characterized in that said refractory oxide comprises zirconium oxide.

12. A thermal cell according to claim 10 further characterized in that said anode also comprises a minor amount of a fusible salt electrolyte.

13. A thermal cell according to claim 10 further characterized in that said anode also comprises a minor amount of a lithium chloride-potassium chloride mixture.

14. A thermal cell according to claim 10 further characterized in that said anode also comprises a minor amount of an eutectic mixture of lithium chloride and potassium chloride.

15. A thermal cell according to claim 10 further characterized in that said refractory oxide has a particle size of from about 80 to about 325 mesh and said alloy has a particle size of from about 80 to about 120 mesh.

16. A thermal cell according to claim 10 further characterized in that said anode comprises from about 10 wt. % to about 16 wt. % zirconium oxide, from about 9 wt. % to about 13 wt. % eutectic mixture of lithium chloride and potassium chloride, and from about 71 wt. % to about 81 wt. % of said alloy.

17. A thermal cell according to claim 10 further characterized in that said anode comprises about 13 wt. % zirconium oxide, about 11 wt. % eutectic mixture of lithium chloride and potassium chloride, and about 76 wt. % of said alloy.

18. A thermal cell according to claim 10 further characterized in that said alloy contains not more than about 0.005 wt. % sodium.

* * * * *